United States Patent [19]

Smith et al.

[11] 3,773,038
[45] Nov. 20, 1973

[54] DIGITAL COMPUTING CARDIOTACHOMETER

[75] Inventors: Hubert E. Smith, Huntsville; John R. Rasquin, Madison; Roy A. Taylor, Huntsville, all of Ala.

[73] Assignee: The United States of America as represented by the Administrator of the National Aeronautics and Space Administration, Washington, D.C.

[22] Filed: Apr. 7, 1972

[21] Appl. No.: 242,027

[52] U.S. Cl....... 128/2.06 F, 128/2.05 T, 324/78 D, 324/186
[51] Int. Cl............................................. A61b 5/04
[58] Field of Search.................. 128/2.05 P, 2.05 R, 128/2.05 T, 2.06 A, 2.06 F, 2.06 R; 307/233; 324/78 D, 79 D, 186; 328/140

[56] References Cited
UNITED STATES PATENTS

| | | | |
|---|---|---|---|
| 2,927,271 | 3/1960 | Gordon | 324/78 D |
| 3,518,983 | 7/1970 | Jorgensen | 128/2.06 A |
| 3,581,196 | 5/1971 | Spaid | 324/186 |
| 3,599,628 | 8/1971 | Abbenante et al. | 128/2.06 F |
| 3,661,147 | 5/1972 | Mason et al. | 128/2.05 T |

Primary Examiner—William E. Kamm
Attorney—L. D. Wofford, Jr. et al.

[57] ABSTRACT

A device for the measurement of heart rate in which the interval between two succeeding heart beats is measured by counting cycles from a fixed frequency source occurring between the two beats and heart rate is computed during the interval between the next two beats by counting the number of times that the interval count must be counted to zero in order to equal a total count of 60 times (to convert to beats per minute) the frequency of the fixed frequency source.

5 Claims, 2 Drawing Figures

3,773,038

DIGITAL COMPUTING CARDIOTACHOMETER

ORIGIN OF THE INVENTION

The invention described herein was made by employees of the United States and may be manufactured and used by or for the Government of the United States of America for Governmental purposes without the payment of any royalties thereon or therefor.

BACKGROUND OF THE INVENTION

This invention relates to rate measurement devices or tachometers and particularly to a tachometer for very accurately measuring heart rate on a substantially instantaneous basis.

GENERAL DESCRIPTION OF THE PRIOR ART

Heretofore the electrical measurement of the rate of occurrence of reoccuring events such as heart rate has generally included the process of developing a pulse of constant width and amplitude for each occurrence of an event and then the pulses so obtained used to charge a capacitor connected in a relatively long time constant circuit. The resulting voltage on the capacitor thus varies with the number of pulses applied to the capacitor within a predetermined time and thus there is developed a voltage which may be measured to give an indication of an average rate of occurrence of the pulses and thus the rate of occurrence of of the events. Alternate approaches have involved digital techniques of counting heart beats for a predetermined period of time and then multiplying the count by the reciprocal of the fraction of the minute of the count. Both of these approaches generally require that the sampling of heart beats be for a significant fraction of a minute in order to achieve substantial accuracy. While this limitation is not always significant there are many instances where it is desirable to determine on essentially a count-by-count basis the rate in beats per minute of heart beat.

SUMMARY OF THE INVENTION

Accordingly, it is an object of this invention to provide an improved rate measurement system capable of essentially instantaneous measurements of heart rate and at the same time preserve substantial accuracy.

These and other objects, features and advantages are accomplished in the invention which encompasses an electronic system which: one, employs a first counter to measure the interval of time between two succeeding heart beats by counting pulses of a fixed frequency during this interval; two, during the next interval between pulses, tranfers the accumulated count into a second counter and a down counter, repeatedly, each time that the down counter reaches a zero count and continues until the second counter reaches a count equal to 60 times the frequency of the pulse input to the first counter; and three, then by counting in a third counter the number of times that the down counter is counted to zero in order to provide a full count in the second counter a heart rate is provided as the count of the third counter. All of this occurs during the two intervals between three succeeding heart beats.

DESCRIPTION OF THE PREFERRED EMBODIMENT

Figure 1:
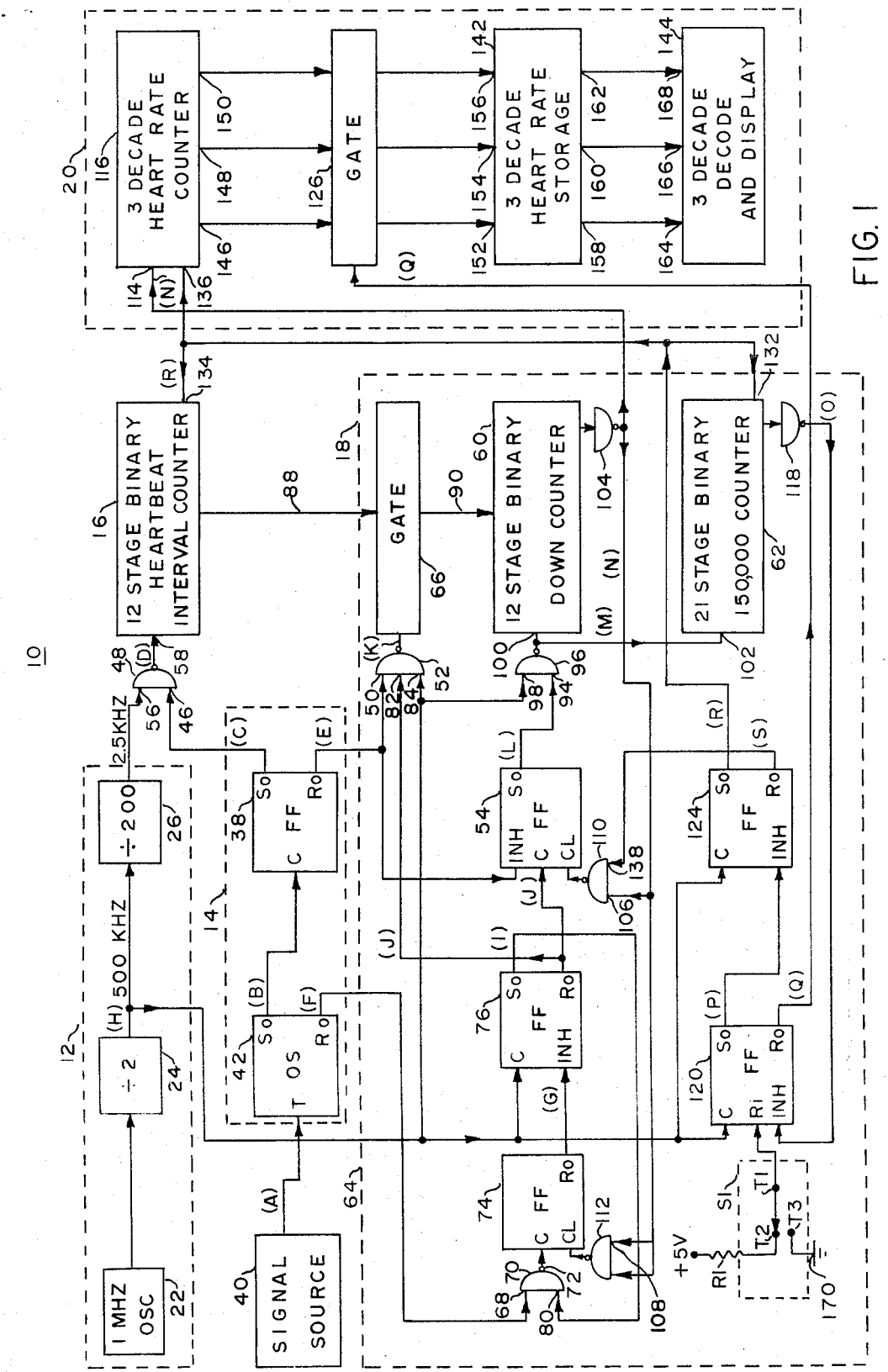
FIG. 1 is an electrical block diagram of an embodiment of the invention.
Figure 2:
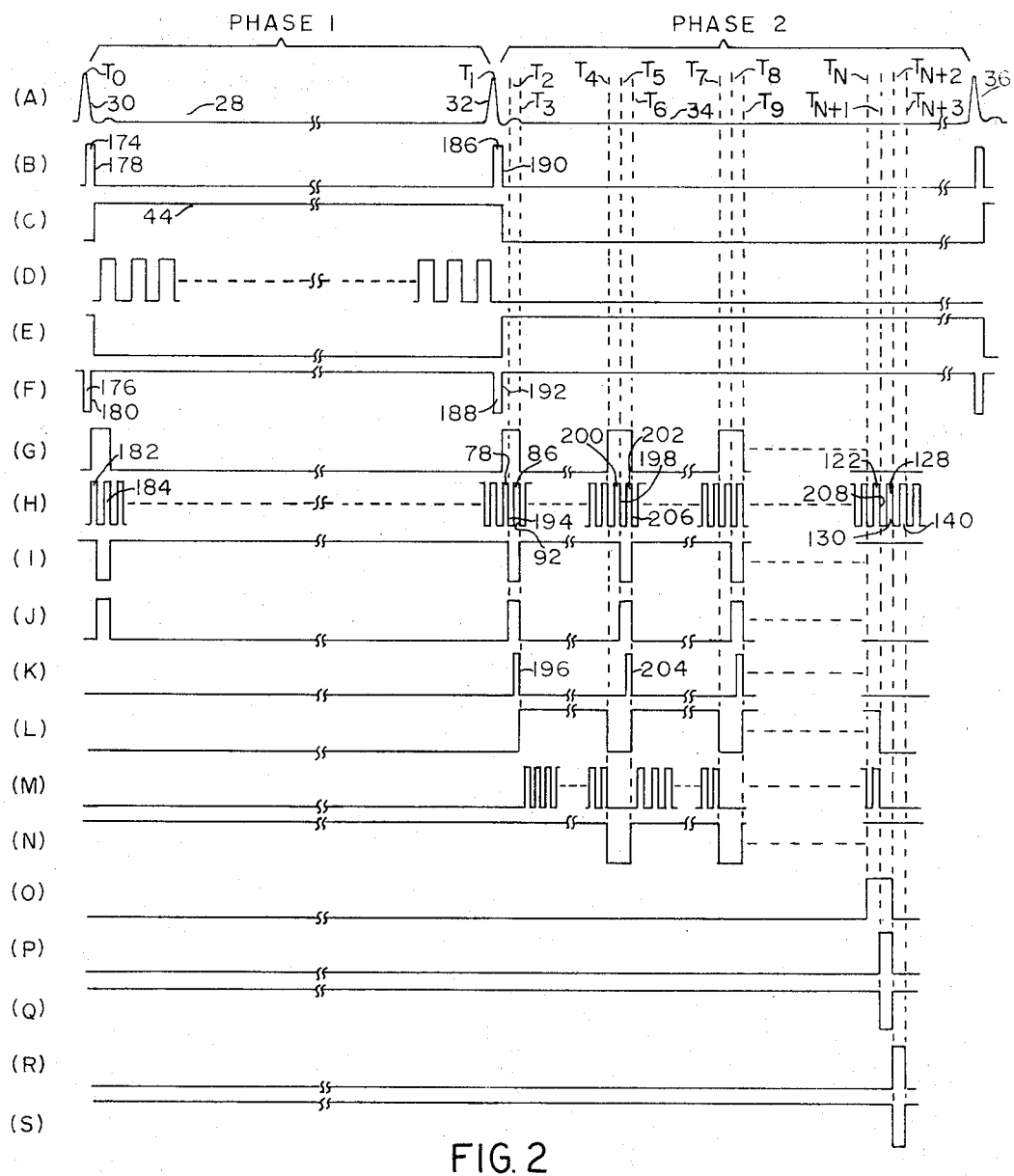
FIG. 2 consists of a series of waveforms illustrative of the operation of the invention.

Referring to the drawings, cardiotachometer 10 is functionally divided into five circuits as follows: clock oscillator 12, input trigger and phase select circuit 14, heat beat interval measurement counter 16, heart rate computer 18 and storage and display circuit 20. As an aid in following the signal flow through this system the waveforms on connecting leads and in the text are referenced by the letter references, in parenthesis, employed in FIG. 2.

Clock oscillator 12 includes, in series, 1 megacycle crystal oscillator 22, divide-by-2 divider 24 and divide-by-200 divider 26.

Functionally, cardiotachometer 10 may be divided into two reoccurring phases of operation, heart beat interval measurement and heart rate computation. The first of these occurs in counter 16 and the second in computer 18. During heart beat interval measurement, the interval 28 between a first heart beat 30 (A) and a second heart beat pulse 32 is registered by gating 2.5 KHz pulses (D) from clock oscillator circuit 12 into counter 16. In the heart rate computation phase, and during the interval 34 between second heart beat pulse 32 and third heart beat pulse 36 heart rate computer 18 converts the binary count accumulated in counter 18 into heart rate information, which is stored and displayed by storage and display circuit 20.

Phase one of operation is initiated as phase select flip-flop 38 is switched to a set condition by a first input heartbeat pulse 30 (A) as follows. A signal source 40 such as a cardiac electrode is coupled to trigger input T of oneshot multivibrator 42. Set output So (B) of one shot 42 is coupled to clock input C of flip-flop 38. Set output So (C) of flip-flop 38 provides a positive output pulse 44 (C) to enable input 46 of NAND gate 48. Reset output Ro(E) inhibits input 50 of NAND gate 52 and input INH of flip-flop 54 in order to inhibit the operation of computer 18. The output of divide-by-200 divider 26 is coupled to input 56 of NAND gate 48 having its output coupled to input 58 of 12 stage binary counter 16.

Phase 1 of operation is concluded and phase 2, or compute phase, is initiated when the second heartbeat pulse 32 (A) triggers one shot 42. Set output So(B) of one shot 42 clocks phase select flip-flop 38 to a reset state. Set output So(C) applies a zero inhibit to input 46 of NAND gate 48. Reset output Ro(E) enables input 50 of NAND gate 52 and enables clock input C of flip-flop 54 thus enabling operation of heart rate compute circuitry 18.

Heart rate computer 18 includes 12 stage down counter 60, 21 stage 150,000 count counter 62 and associated computer control circuitry 64, to sequentially shift, through gate circuit 66, the number held in counter 16 into down counter 60, then count it down to zero at a 500 KHz rate, while simultaneously increasing the count in counter 62 by the same number of counts until counter 62 reaches a count of 150,000. The logic sequence just described divides the number in down counter 60 into 150,000 by a process of accumulation, to convert time, in seconds, between heart beats to heart rate in beats per minute. To illustrate, assume $X$ time in seconds elapses between sequential heart beats. Then $60/X$ = number of times this interval would occur during 60 seconds or one minute. Since time in seconds is represented by a number of pulses at 2.5 KHz rate then in 60 seconds or one minute there would have occurred 60 × 2,500 or 150,000 pulses. Thus assuming an elapsed time of one second between sequential heartbeats, the heart rate would be (60 × 2500)/2,500 or 60 beats per minute.

Counter 16 is strobed into down counter 60 by control circuitry 64 interconnected as follows. Reset output Ro(F) of one shot 42 is coupled to input 68 of NAND gate 70, having output 72 coupled to clock input C of flip-flop 74. Upon the occurrence of second heartbeat pulse 32, flip-flop 74 is reset by an output of NAND gate 70. Reset output Ro(G) of flip-flop 74 enables clock input C of flip-flop 76, coupled to the output (H) of divide-by-2 divider 24, a source of 500 KC clocks pulses (H). As a result the next 500 KC clock pulse 78(H) resets flip-flop 76 and set output So(I) falls to zero, inhibiting input 80 of NAND gate 70, as reset output Ro(J) rises to a positive level, enabling clock input C of flip-flop 54 and input 82 of NAND gate 52. Since a third input 84 of NAND gate 52 is coupled to the output of divide-by-2 divider 24, the next clock pulse 86 is fed from the output of NAND gate 52 to the control input of gate 66 and thus strobes information now held in counter 16 into down counter 60 through appropriate interconnecting lines 88 and 90. The trailing edge 92(H) of clock pulse 86 Simultaneously clocks flip-flop 76 to a set condition. Set output So(I) resets flip-flop 74 through input 72 of NAND gate 70. Reset output Ro(J) inhibits NAND gate 52 and clocks flip-flop 54 to a set condition. Set output So(L) of flip-flop 54 enables input 94 of NAND gate 96, having a second input 98 coupled to the output of divide-by-2 divider 24.

The output of NAND gate 96(M) is coupled to parallel inputs 100 and 102 of down counter 60 and counter 62, respectively, and thus down counter 60 is counted down at a 500 KHz rate as counter 62 is stepped up at the same rate. As down counter 60 reaches a zero count, zero detect gate 104 is enabled. The output (N) of zero detect gate 104 is coupled to inputs 106 and 108 of NAND gates 110 and 112, respectively, having outputs coupled, respectively, to inputs CL of flip-flops 54 and 74. Thus each time down counter 60 reaches a count of zero, flip-flops 54 and 74 are reset to again strobe the number held in counter 16 into down counter 60 and repeat the sequence as described above. The output of zero detect gate 104 is also coupled to input 114 of three decade heart rate counter 116 and each time down counter 60 reaches a count of zero, one count is stored in counter 116. This compute sequence continues until counter 62 reaches a full count of 150,000 enabling end of operation gate 118.

The output of end of operation gate 118 is coupled to inhibit input INH of flip-flop 120. At a count of 150,000, the output of gate 118(O) removes zero inhibit INH from clock input C of flip-flop 120, coupled to the output of divide-by-2 divider 24. The next successive 500 KHz clock pulse 122 sets flip-flop 120. Set output So(P) of flip-flop 20 removes the inhibit condition from clock input C of flip-flop 124. Reset output Ro(Q) of flip-flop 120 provides a strobe pulse (Q) to the control input of strobe gate 126 of storage and display circuit 20. The trailing edge 128 of the next clock pulse 130 resets flip-flop 120 and sets flip-flop 124. Set output So(R) of flip-flop 124 performs system reset, being coupled to reset inputs 132, 134 and 136 of counter 62, counter 16 and counter 116, respectively. Reset output Ro(S) of flip-flop 124 is coupled to input 138 of NAND gate 110 to reset flip-flop 54 and halt the compute cycle. The following clock pulse 140 resets flip-flop 124.

Heart rate information is displayed by storage and display circuitry 20 which comprises three decade heart rate counter 116 gating circuit 126, heart rate storage register 142 and decode and display circuit 144. Heart rate counter 116 includes three B.C.D. counters, internally connected to count a conventional B.C.D. count. B.C.D. outputs 146, 148 and 150 are coupled through gate 126 to inputs 152, 154 and 156, respectively, of storage register 142. B.C.D. outputs 158, 160 and 162 from storage register 142 are in turn connected to respective inputs 164, 166 and 168 of decode and display circuit 144, where they are decoded and displayed, in the form of a three digit decimal number, by conventional readout devices such as nixie tubes, etc.

Manual reset is accomplished by manual reset switch S1. Manual reset switch S1 includes movable contact $T_1$ connected to reset input RI of flip-flop 120, with normally closed contact $T_2$ being connected through RI to plus five volts, and normally open contact $T_3$ connected to system ground 170.

SYSTEM OPERATION

Assume that cardiotachometer 10 has been energized and that manual reset switch S1 has been operated to estalish that the system is initially reset. All other logic circuitry will assume the proper steady state condition after the occurrence of one heart beat pulse. Next assume that at some arbitrary time $T_0$ a first heart beat pulse 30(A) triggers one shot 42. Complementary output pulses 174 and 176 occur at set and reset outputs So(B) and Ro(F) respectively. The trailing edge 178 of pulse 174 sets phase select flip-flop 38, initiating phase 1 of operation. The position or true signal (C) at set output So of flip-flop 8 enables NAND gate 48, and thus gates 2.5 KHz pulses (D) from output of divide-by-200 divider 26 into heartbeat interval counter 16. Reset output Ro(E) of flip-flop 38 drops to zero volts applying a zero inhibit voltage to input 50 of NAND gate 52, and inhibit input INH of flip-flop 54, within compute circuit 18.

The trailing edge 180 of complementary pulse 176(F) simultaneously resets flip-flop 74 through inut 68 of NAND gate 70. Reset output Ro(G) enables clock input C of flip-flop 76. The first recurrent 500 KC clock pulse 182(H) resets flip-flop 76 and a second clock pulse 184 again sets flip-flop 76. Flip-flop 74 is returned to a set condition through input 80 of NAND gate 70 as flip-flop 74 is set. Although compute circuit 18 is inhibited from further activity by reset output Ro(E) of flip-flop 38, the recycling of flip-flops 74 and 76, described above, assures that flip-flops 74 and 76 are in the proper condition for normal operation. As the second heartbeat 32(A) occurs at $T_1$, one shot 42 is again triggered, producing a positive pulse 186 at set output So(B) and a negative going pulse 188 at reset output Ro(F). The trailing edge 190 of pulse 186 resets flip-flop 38. Set output So(C) of flip-flop 38 inhibits NAND gate 48, to stop the flow of 2.5 KHz pulses to heartbeat interval counter 16. Reset output Ro(E) of flip-flop 38 enables input 50 of NAND gate 52 and removes zero inhibit from clock input C of flip-flop 54, to enable operation of compute circuit 18.

Phase 2 or the computation phase of operation is initiated as the trailing edge 192 of reset output Ro(F) pulse 188 of one shot 42, resets flip-flop 74 through input 68 of NAND gate 70. Reset output Ro(G) of flip-flop 74 removes inhibit from clock input C of flip-flop 76. At $T_2$ trailing edge 194 of the next succeeding clock pulse 78(H) resets flip-flop 76. Reset output Ro(J) of flip-flop 76 enables input 82 of NAND gate 52 as a positive level is applied to clock input C of flip-flop 54. Set output So(I) drops to a zero level to inhibit input 80 of NAND gate 74. Since inputs 50 and 82 of NAND gate 52 are now enabled by respective reset outputs Ro(E) of flip-flop 38 and Ro(J) of flip-flop 76, at $T_3$ the next 500 KC clock pulse 86(H) is gated through input 84 of NAND gate 52 as a strobe pulse 196(K) to gate circuit 66. A quantity equal to the number of 2.5 KHz pulses (D) contained in counter 16 is strobed into down counter 60. The trailing edge 92 of clock pulse 86 simultaneously sets flip-flop 76. Set output So(I) goes positive, returning flip-flop 74 to a set condition through input 80 of NAND gate 70, thus inhibiting clock input C of flip-flop 76 through reset output Ro(G). Reset output Ro(J) goes false inhibiting input 82 of NAND gate 52 and clocking flip-flop 54 to a set state. Set output So(J) of flip-flop 54 enables NAND gate 96, gating 500 KHz clock pulses (H) into down counter 60 and counter 62(M). Thus down counter 60 is counted down at a 500 KHz rate as counter 62 is stepped up at the same rate. Assuming that the time interval 28 between heartbeat pulses 30 and 32 is exactly one second, then 2500 pulses will be stored in counter 16, and thus strobed into down counter 60, since 2500 pulses per second are gated to interval counter 16. Then at $T_4$ as down counter 60 counts down 2500 pulses, zero detect gate 104 is enabled, producing a negative going pulse (N) to reset flip-flops 54 and 74 through inputs 106 and 108 of NAND gates 110 and 112, respectively, and step heart rate counter 116 one count through input 114. As flip-flop 54 is reset, set output So(L) inhibits NAND gate 76 stopping flow of 500 KHz pulses to down counter 60 and 150,000 counter 62, which now contains a count of 2500. As flip-flop 74 is reset, clock input C of flip-flop 76 is again enabled by reset output R1 of flip-flop 74 and at $T_5$ the trailing edge 198 of the next 500 KHz clock pulse 200 reset flip-flop 76. Reset output Ro(J) enables input 82 of NAND gate 52 and applies a positive level (J) to clock input C of flip-flop 54. The next 500 KHz clock pulse 202 is gated through input 84 of NAND gate 52 as a strobe pulse 204 to input (K) of gate 66 to strobe a second 2500 count into down counter 60. At $T_6$ the trailing edge 206 of clock pulses 202 clock flip-flop 76 to a set state. Set output So(I) sets flip-flops 74 and clock input C of flip-flop 76 is once again inhibited by reset output Ro of flip-flop 74. Reset output Ro(J) of flip-flop 76 drops to zero to set flip-flop 54 through clock input C. Set output So(L) enables NAND gate 96 to gate 500 KHz clock pulses to down counter 60 and 150,000 count counter 62. An identical sequence to that just described occurs at $T_7$, $T_8$ and $T_9$, and all subsequent like countdown intervals unit 150,000 counter 62 reaches a count of 150,000, at $T_n$. In the above illustration, after down counter 60 counts down 60 times, counter 62 contains a count of 150,000, 60 × 2500 = 150,000. At the end of each down count, zero detect gate 104 steps heart rate counter 116 time. Thus a count of 60 is contained in heart rate counter 116 at T. The compute cycle is completed at $T_n$ as end of operation gate 118 is enabled when counter 62 reaches a full count of 150,000. Output (O) of gate 118 goes true or positive, enabling clock input C of flip-flop 120. The trailing edge 208 of the next 500 KHz pulse 122 at $T_n+1$, sets flip-flop 120. Set output So(P) goes true enabling clock input C of flip-flop 124. Reset output Ro(Q) drops to zero strobing information from heart rate counter 116 into heart rate storage register 142, where it is immediately decoded and displayed by decode and display circuitry 144 as a heart rate. At $T_{n+2}$ flip-flop 124 is set and flip-flop 120 is reset by trailing edge 128 of clock pulse 130. Reset output Ro(S) resets flip-flop 54 through input 138 of NAND gate 110 to halt compute cycle. Set output So(R) applies a positive system reset pulse to reset inputs 132, 134 and 136 of 21 stage binary counter 62, heartbeat interval counter 16 and heart rate counter 116. At $T_{n+3}$, trailing edge of clock pulse 140 resets flip-flop 124. The system is now prepared to read the next heart beat interval.

While the system described herein is specifically directed to heart rate measurement on essentially a beat-by-beat basis, where desired, heart rate averaging may be achieved by dividing the heart beat input and 2.5 KHz clock frequency by the demoninator of the fraction of a minute for which averaging is to occur. The range of measurement of the system is for heart beats in the range of approximately 36 to 200 heart beats per minute but may be expanded by the use of higher frequencies and larger registers.

While the 2.5 KHz rate for clocking counter 16 is employed in the present illustration of the invention it is to be understood that this rate may be varied and typically would be within the range of 1.0 to 5.0 KHz. In any such case the maximum or full count of counter 62 would be 60 times this rate. Similarly, while a specific rate of 500 KHz is used to count down counter 60 and count up counter 62, it is to be appreciated that this may be varied and typically would be within the range of 250 to 1000 KHz.

Generally the frequency fed to down counter 60 and 70 counter 62 would be at least 200 times higher than the rate fed counter 16 in order to insure that a rate of 200 beats per minute could be computed between two heart beats.

What is claimed is:

1. A cardiotachometer comprising:
    sensing means responsive to a source of heart beats for providing as an output a discrete pulse for each heart beat;
    a first souce of fixed frequency energy providing an output of a preselected frequency;
    a first counter;
    first gating means responsive to the output of said sensing means for connecting the output of said first source of fixed frequency energy to said first counter during a first set of alternate periods between succeeding said pulses, whereby said counter periodically registers a count proportional to alternate periods between pulses;
    a second said source of fixed frequency energy of substantially higher frequency than said first source of fixed frequency energy;

a second counter having a maximum count equal to 60 times the frequency in cycles per second of said first source of fixed frequency energy;

a downcounter;

second gating means responsive to a zero count of said down counter, alternate said pulses from said sensing means, and less than a full count in said second counter for connecting said second source of fixed frequency energy to said down counter and said second counter, whereby during a second set of alternate periods between succeeding pulses said down counter is counted down a number of times sufficient to produce a full count in said second counter;

a third counter responsive to each zero count of said down counter for registering a count in said third counter and thus a total count equal to the said number of said zero counts occurring between succeeding said pulses;

display means;

full count sensing means responsive to a full count of said second counter for transferring the count in said third counter to said display means whereby the count displayed is representative of heart rate.

2. A cardiotachometer as set forth in claim 1 wherein said second source of fixed frequency energy is at least 200 times higher in frequency than the frequency of said first source of fixed frequency energy.

3. A cardiotachometer as set forth in claim 2 wherein said first gating means comprises a means for providing alternate state outputs on the occurrence of succeeding said pulses and an input of said second gating means is connected to an output of said first gating means for providing said alterante said pulses.

4. A cardiotachometer as set forth in claim 3 wherein the frequency of said first source of fixed frequency energy is within the range of 1.0 to 5.0 KHz and the frequency of said second source of fixed frequency energy is within the range of 250 to 1,000 KHz.

5. A cardiotachometer as set forth in claim 4 wherein said first source of fixed frequency energy comprises a frequency divider responsive to said second source of fixed frequency energy.

* * * * *